US012126799B2

(12) United States Patent
Galpin et al.

(10) Patent No.: US 12,126,799 B2
(45) Date of Patent: Oct. 22, 2024

(54) METHOD AND DEVICE FOR PICTURE ENCODING AND DECODING

(71) Applicant: InterDigital Madison Patent Holdings, SAS, Paris (FR)

(72) Inventors: Franck Galpin, Thorigne-Fouillard (FR); Philippe Bordes, Laille (FR); Fabien Racape, San Francisco, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 332 days.

(21) Appl. No.: 17/431,630

(22) PCT Filed: Feb. 6, 2020

(86) PCT No.: PCT/US2020/016961
§ 371 (c)(1),
(2) Date: Aug. 17, 2021

(87) PCT Pub. No.: WO2020/180449
PCT Pub. Date: Sep. 10, 2020

(65) Prior Publication Data
US 2022/0141456 A1     May 5, 2022

(30) Foreign Application Priority Data
Mar. 4, 2019   (EP) .................................... 19305249

(51) Int. Cl.
*H04N 19/117* (2014.01)
*G06N 3/045* (2023.01)
(Continued)

(52) U.S. Cl.
CPC ........... *H04N 19/117* (2014.11); *G06N 3/045* (2023.01); *H04N 19/105* (2014.11);
(Continued)

(58) Field of Classification Search
CPC .. H04N 19/117; H04N 19/105; H04N 19/149; H04N 19/176; H04N 19/82;
(Continued)

(56) References Cited

U.S. PATENT DOCUMENTS

2018/0174046 A1* 6/2018 Xiao ................. G06F 18/24133
2019/0333219 A1* 10/2019 Xu ......................... G06T 11/008
(Continued)

FOREIGN PATENT DOCUMENTS

| CN | 108174225 A | | 6/2018 |
|---|---|---|---|
| CN | 109257600 | * | 1/2019 |
| CN | 109257600 A | | 1/2019 |

OTHER PUBLICATIONS

Qu et al., "A New Generative Adversarial Network for Texture preserving image denoising", 2018 Eighth International Conference on Image Processing Theory, Tools and Applications (IPTA), Xi'an, China, Nov. 7, 2018, 5 pages.

(Continued)

*Primary Examiner* — Kathleen V Nguyen
(74) *Attorney, Agent, or Firm* — CONDO ROCCIA KOPTIW LLP

(57) ABSTRACT

A method for video decoding is disclosed. A first reconstructed version of an image block of an encoded video is accessed. The first reconstructed version of said image block is filtered by a first neural network to form a second reconstructed version of said image block to be used as reference. The second reconstructed version of said image block is filtered by a second neural network to form a third reconstructed version of said image block to be displayed. The first and second neural networks are trained jointly.

20 Claims, 13 Drawing Sheets

(51) Int. Cl.
- *H04N 19/105* (2014.01)
- *H04N 19/149* (2014.01)
- *H04N 19/176* (2014.01)
- *H04N 19/82* (2014.01)

(52) U.S. Cl.
CPC ......... *H04N 19/149* (2014.11); *H04N 19/176* (2014.11); *H04N 19/82* (2014.11)

(58) Field of Classification Search
CPC ........ H04N 19/86; G06N 3/045; G06N 3/047; G06N 3/048; G06N 3/08
See application file for complete search history.

(56) References Cited

U.S. PATENT DOCUMENTS

2020/0137384 A1* 4/2020 Kwong ............... H04N 19/11
2020/0175374 A1* 6/2020 Hestness ............. G06N 3/047

OTHER PUBLICATIONS

English Translation for CN108174225A, entitled "Filter Achieving Method and System in Coding and Decoding Video Loop based on Confrontation Generation Network", 13 pages.

Dai et al., "A Convolutional Neural Network Approach for Post-Processing in HEVC Intra Coding", Cornell University, Computer Science, Document arXiv:1608.06690v2, Oct. 29, 2016, 12 pages.

Lin et al., "Deep Convolutional Neural Network for Decompressed Video Enhancement", 2016 Data Compression Conference (DCC), Snowbird, Utah, USA, Mar. 30, 2016, 1 page.

Ma et al., "Residual-based video restoration for HEVC intra coding", 2018 IEEE Fourth International Conference on Multimedia Big Data (BigMM), Sep. 13, 2018, Xi'an, China, 7 pages.

Kuanar et al., "Deep learning based HEVC in-loop filtering for decoder quality enhancement", 2018 Picture Coding Symposium (PCS), San Francisco, California, USA, Jun. 24, 2018, pp. 164-168.

Li et al., "CNN based post-processing to improve HEVC", 2017 IEEE International Conference on Image Processing (ICIP), Beijing, China, Sep. 17, 2017, 4 pages.

Cui et al., "Convolutional neural networks based intra prediction for HEVC", 2017 Data Compression Conference (DCC), Snowbird, Utah, USA, Apr. 4, 2017, 10 pages.

English Translation of CN109257600A, entitled "A Kind of Adaptive Minimizing Technology of Video Compression Artifact Based on Depth Learning", 20 pages.

Huo et al., "Convolutional Neural Network-Based Motion Compensation Refinement for Video Coding", 2018 IEEE International Symposium on Circuits and Systems (ISCAS), Florence, Italy, May 27, 2018, 4 pages.

Park et al., "CNN-based in-loop filtering for coding efficiency improvement", 2016 IEEE 12th Image, Video, and Multidimensional Signal Processing Workshop (IVMSP), Florence, Italy, Jul. 11, 2016, 5 pages.

Jin et al, "Quality enhancement for intra frame coding via Cnns: An adversarial approach", 2018 IEEE International Conference on Acoustics, Speech and Signal Processing (ICASSP), Apr. 15, 2018, Calgary, Alberta, Canada, pp. 1368-1372.

* cited by examiner

METHOD AND DEVICE FOR PICTURE ENCODING AND DECODING

CROSS REFERENCE TO RELATED APPLICATIONS

This application is the national stage entry under 35 U.S.C. § 371 of International Application PCT/US2020/016961, filed Feb. 6, 2020, which was published in accordance with PCT Article 21(2) on Sep. 10, 2020, in English, and which claims the benefit of European Patent Application No. 19305249.5, filed Mar. 4, 2019.

TECHNICAL FIELD

At least one of the present embodiments generally relates to a method and an apparatus for picture encoding and decoding, and more particularly, to a method and an apparatus for filtering with a plurality of neural networks in video encoding and decoding.

BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors, prediction residuals or predictor, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

BRIEF SUMMARY

According to a general aspect of at least one embodiment, a method for video decoding is presented, comprising:
accessing a first reconstructed version of an image block of an encoded video; and
filtering said first reconstructed version of said image block by a first neural network to form a second reconstructed version of said image block to be used as reference,
filtering said second reconstructed version of said image block by a second neural network to form a third reconstructed version of said image block to be displayed, wherein the first and second neural networks are trained jointly.

According to a general aspect of at least one embodiment, an apparatus for video decoding is presented, comprising one or more processors configured to perform: accessing a first reconstructed version of an image block of an encoded video; and filtering said first reconstructed version of said image block by a first neural network to form a second reconstructed version ($\check{S}$) of said image block to be used as reference, filtering said second reconstructed version of said image block by a second neural network to form a third reconstructed version of said image block to be displayed, wherein the first and second neural networks are trained jointly.

According to a general aspect of at least one embodiment, a method for encoding video data is presented, comprising:
accessing a first reconstructed version of an image block of an encoded video; and
filtering said first reconstructed version of said image block by a first neural network to form a second reconstructed version of said image block to be used as reference,
filtering said second reconstructed version of said image block by a second neural network to form a third reconstructed version of said image block to be displayed, wherein the first and second neural networks are trained jointly.

According to a general aspect of at least one embodiment, an apparatus for encoding video data is presented, comprising one or more processors configured to perform: accessing a first reconstructed version of an image block of an encoded video; and
filtering said first reconstructed version of said image block by a first neural network to form a second reconstructed version of said image block to be used as reference,
filtering said second reconstructed version of said image block by a second neural network (to form a third reconstructed version of said image block to be displayed, wherein the first and second neural networks are trained jointly.

According to another general aspect of at least one embodiment, a bitstream is formatted to include signal generated according to the encoding methods described above.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

DETAILED DESCRIPTION

Figure 1:
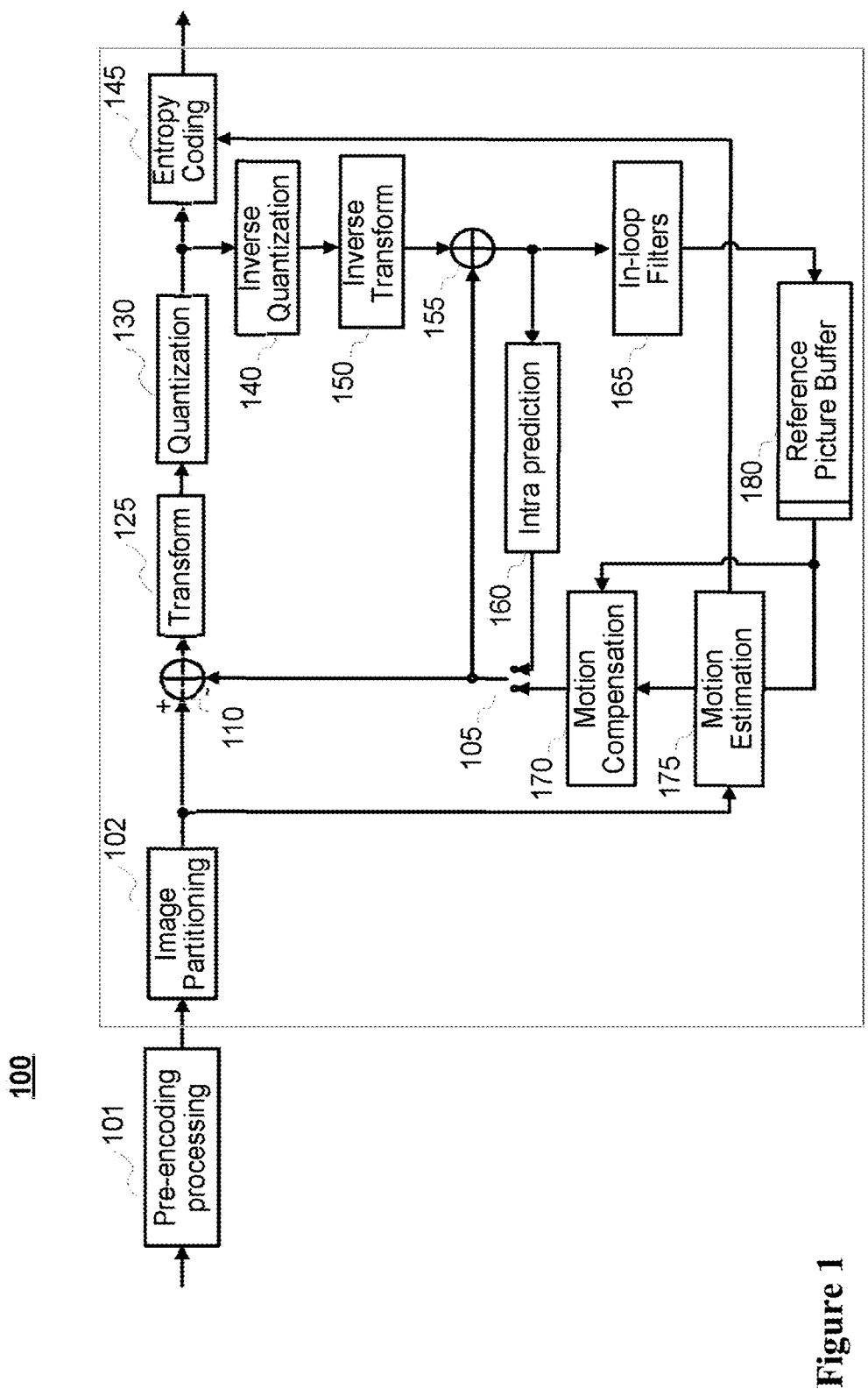
FIG. 1 illustrates a block diagram of an exemplary HEVC (High Efficiency Video Coding) video encoder

In HEVC coding, a picture is partitioned into CTUs of square shape with a configurable size typically 64×64. The size may be 128×128, or 256×256 in other video coding standards. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a block) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a block that may be further split into smaller blocks also named sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 2:
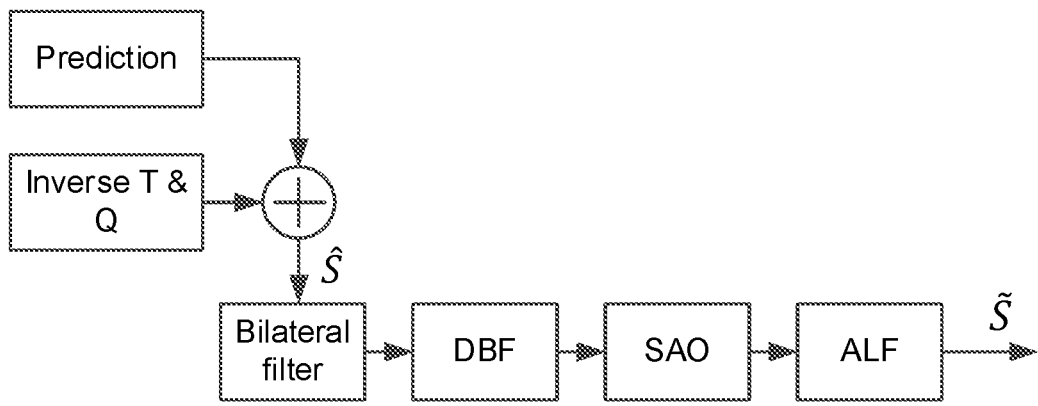
FIG. 2 illustrates four in-loop filters used in JEM 6.0.
Figure 10:
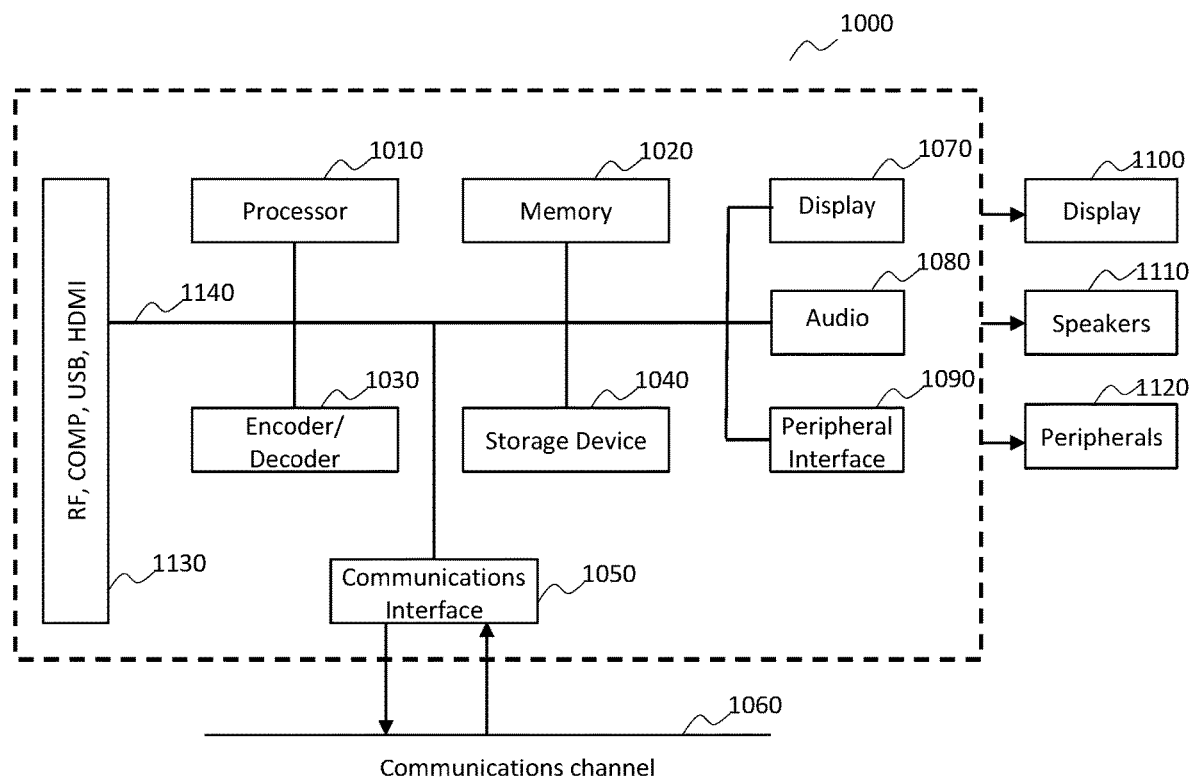
FIG. 10 illustrates a block diagram of an exemplary system in which various aspects of the exemplary embodiments may be implemented.

The aspects described and contemplated in this application can be implemented in many different forms. FIGS. 1, 2 and 10 below provide some embodiments, but other embodiments are contemplated and the discussion of FIGS. 1, 2 and 10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the in-loop filter modules and post decoding processing (165, 265, 285), of a video encoder 100 and decoder 200 as shown in FIGS. 1 and 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of layers of a Convolutional Neural Network, the number of convolutions per layer, etc. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, DBF(deblocking)/SAO (Sample Adaptive Offset) filtering to reduce encoding artifacts. More generally for video compression, other filters can be used for in-loop filtering. For example, as shown in FIG. 2 for the current JEM 6.0 (Joint Exploration Model 6.0) developed by JVET (Joint Video Exploration Team), four filters, namely, bilateral filter (BLF), the deblocking filter (DBF), SAO and ALF (Adaptive Loop Filter) are successively applied. These different filters are in general based on: (1) samples analysis and pixels classification and (2) class-dependent filtering. The filtered image is stored at a reference picture buffer (180).

For ease of notation, we refer to the input image to the encoder as S, input to in-loop filtering as Ŝ, and output of in-loop filtering as S̃. Ŝ may also be referred to as an initial reconstruction or an initial reconstructed version of the image. As shown in FIG. 2, the input to in-loop filtering is the sum of predicted samples and the decoded prediction residuals. For certain blocks, when prediction residuals are zero or do not exist (e.g., in SKIP mode), the input to in-loop filtering is the predicted samples directly.

In the current JEM, a bilateral filter is applied before the deblocking filter, to the reconstructed samples Ŝ. BLF works by basing the filter weights not only on the distance to neighboring samples but also on their values. Each sample in the initial reconstructed picture is replaced by a weighted average of itself and its neighbors. The weights are calculated based on the distance from the center sample as well as the difference in sample values. Because the filter is in the shape of a small plus sign (i.e., the filter uses four neighbor samples), all of the distances are 0 or 1.

A sample located at (i, j), will be filtered using its neighboring samples. The weight $\omega(i, j, k, l)$ is the weight assigned to a neighboring sample (k, l) for filtering the current sample (i, j), and is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)}$$

where I(i, j) and I(k, l) are the intensity values of samples (i, j) and (k, l), respectively, in the initial reconstruction Ŝ, $\sigma_d$ is the spatial parameter, and $\sigma_r$ is the range parameter. The properties (or strength) of the bilateral filter is controlled by parameters $\sigma_d$ and $\sigma_r$. In JEM 6.0, $\sigma_d$ is set dependent on the transform unit size and prediction mode, and $\sigma_r$ is set based on the QP used for the current block.

The output filtered sample value $I_F(i, j)$ is calculated as:

$$I_F(i, j) = \frac{\sum_{k,l} I(k, l) * \omega(i, j, k, l)}{\sum_{k,l} \omega(i, j, k, l)}$$

The proposed bilateral filter is applied to each CU, or blocks of maximum size 16×16 if the CU is larger than 16×16, in both the encoder and the decoder. In JEM 6.0, the bilateral filter is performed inside the RDO (Rate-Distortion Optimization) loop at the encoder side. Thus, the filtered blocks may also be used for predicting the subsequent blocks (intra prediction).

ALF is basically designed based on Wiener filter, which aims at designing linear filters (1D or 2D) to minimize the L2-distortion, that is, minimizing the square error between the filtered samples and the reference ones (in general the original samples). In the JEM, ALF with block based filter adaption is applied. For the luma component, one among 25 filters is selected for each 2×2 block based on the direction and activity of signal.

Up to three circular symmetric filter shapes are supported for the luma component. An index is signalled at the picture level to indicate the filter shape used for the luma component of a picture. For chroma components in a picture, the 5×5 diamond shape filter is always used.

The block classification is applied to each 2×2 block, which is categorized into one out of 25 classes based on the local signal analysis (gradients, directionality). For both chroma components in a picture, no classification method is applied, i.e., a single set of ALF coefficients is applied to each chroma component.

The filtering process of luma component can be controlled at the CU level. A flag is signalled to indicate whether ALF is applied to the luma component of a CU. For chroma component, whether ALF is applied or not is indicated at the picture level only. ALF filter parameters are signalled in the first CTU, before the SAO parameters of the first CTU. Up to 25 sets of luma filter coefficients could be signalled. To reduce bits overhead, filter coefficients of different classification can be merged. Also, the ALF coefficients of reference pictures can be reused as ALF coefficients of a current picture.

Figure 3:
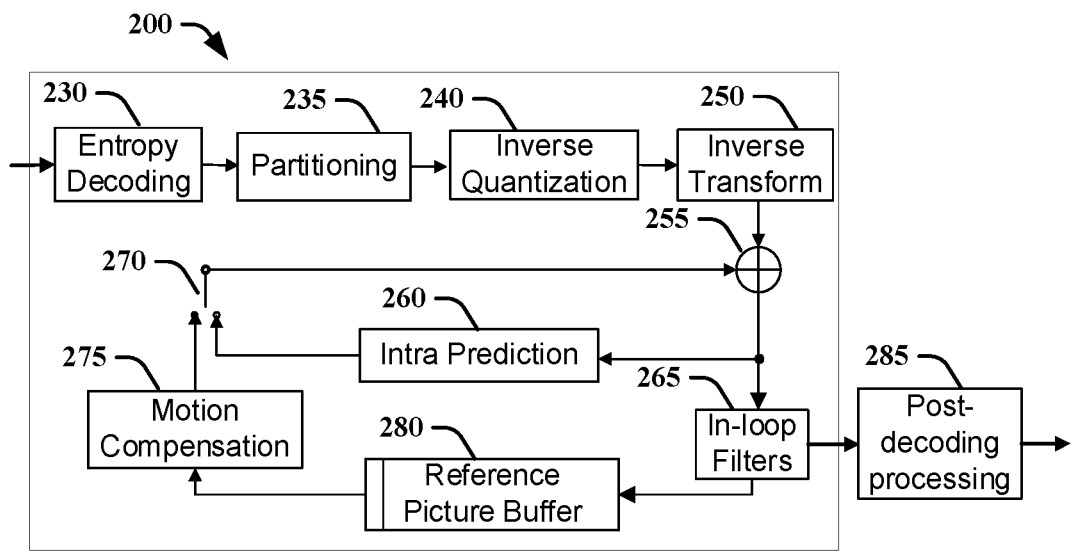
FIG. 3 illustrates a block diagram of an exemplary HEVC video decoder.

FIG. 3 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer RPB (280), also known as Decoded Picture Buffer (DPB).

The decoded picture can further go through post-decoding processing (285), for example, a post-filtering used to improve picture rendering on the display, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

It is known to use deep learning to perform in-loop filtering. The field of deep learning concerns the use of deep neural networks. A neural network contains neurons that are organized by groups called layers. There are the input layer, output layer and hidden layer(s) in a neural network. A deep neural network has two or more hidden layers. Video compression may be considered as linked to pattern recognition, as compression often looks for repetitive patterns in order to remove redundancies. Because artifact removal or artifact reduction in video compression can be considered as recognizing and restoring the original images, it is possible to use neural networks as filters to reduce artifacts. Herein, artifact reduction is also referred to as image restoration, and the neural networks for reducing artifacts may also be referred to as the restoration filters.

Figure 4:
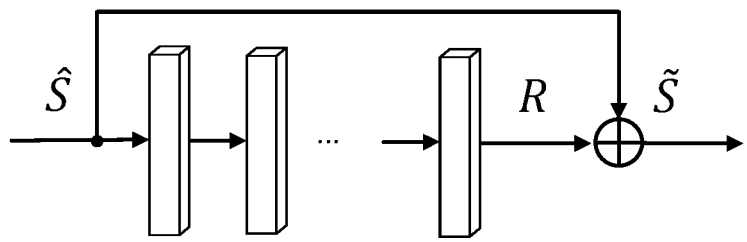
FIG. 4 illustrates an exemplary CNN (Convolutional Neural Network)

FIG. 4 shows an exemplary M-layer convolutional neural network, where the initial reconstruction from the video codec without filtering (Ŝ) is restored as S̃ by adding a residue R computed by the CNN. Mathematically, the network can be represented as:

$$F_1(\hat{S}) = g(W_1 * \hat{S} + B_1),$$

$$F_i(\hat{S}) = g(W_i * F_{i-1}(\hat{S}) + B_i), i = \{2, \ldots, M-1\}$$

$$F_M(\hat{S}) = g(W_M * F_{M-1}(\hat{S}) + B_M) + \hat{S},$$

$$\tilde{S} = F_M(\hat{S}) \quad (1)$$

where $W_i$ and $B_i$ are the weights and bias parameters for layer i, respectively, g( ) is the activation function (e.g., a sigmoid or a Rectified Linear Unit (ReLU) function), and * denotes the convolution operation. The output S̃ from the CNN might be stored in the Reference Picture Buffer (RPB) to be used as predictor for encoding or decoding subsequent frames.

The parameter set θ, including $W_i$ and $B_i$, i={1, ..., M}, can be trained from K training samples $\{S_k\}$, k={1, ..., K}, for example, by minimizing a loss function defined based on the error between restored images and original images, as:

$$L(\theta) = \frac{1}{K} \sum_{k=1}^{K} \|F(\hat{S}_k) - S_k\|^2$$

Note that the loss function may also contain other terms in order to stabilize the convergence or avoid over-fitting. These regularization terms can be simply added to the error function.

Figure 5A:
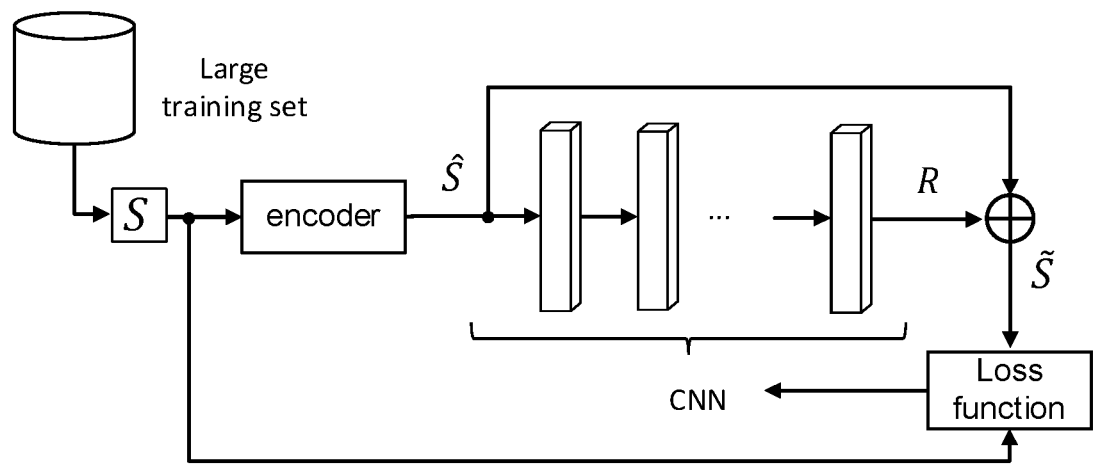
FIGS. 5A, 5B and 5C illustrate the training process, the encoding process and the decoding process, respectively, using a CNN as an in-loop filter.
Figure 5B:
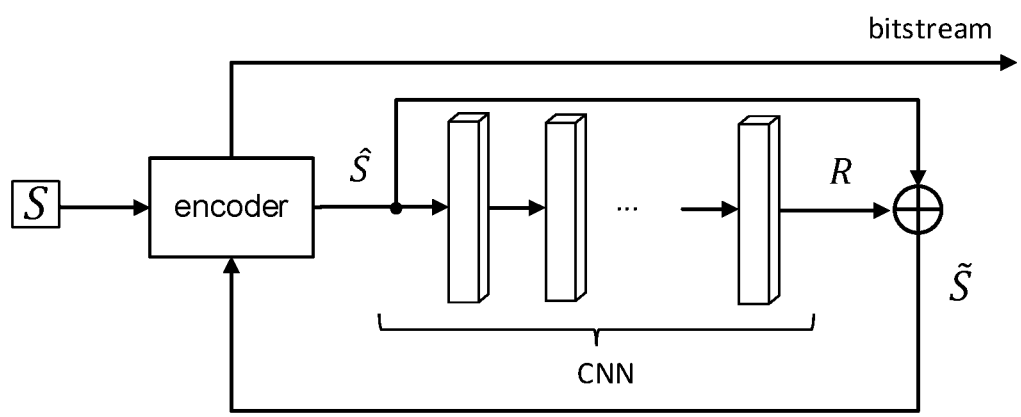
Figure 5C:
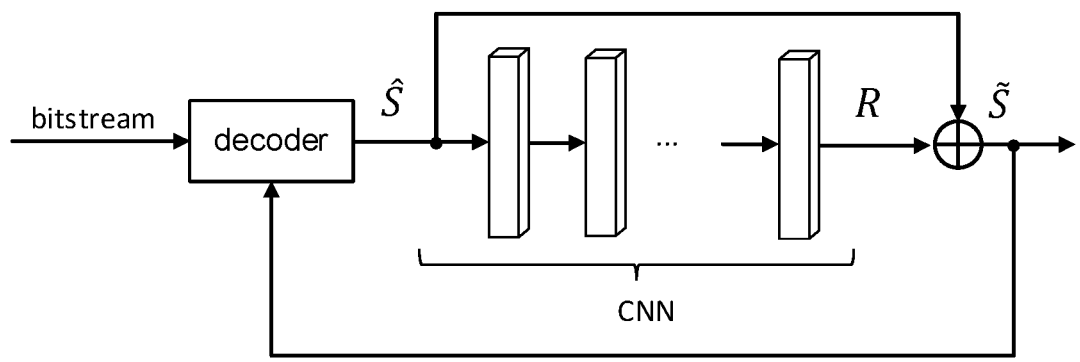

FIG. 5A shows a CNN that is trained on a large database of images, where the network tries to restore a reconstructed image by an encoder, by minimizing the error, i.e. a difference, with the original image. FIG. 5B shows that the resulting CNN is used in the encoder to restore images after reconstruction. The restored images can then be displayed or used as reference to predict other frames in the sequence. Symmetrically, the decoder as shown in FIG. 5C receives the bitstream, reconstructs the images and restores the images using the same CNN.

The input to the first layer of the CNN is usually the Y component of the reconstructed image, i.e., an image of size W×H×1, where W and H are the width and height of the image. To also use other information as input, we consider the reconstructed image as one channel, and input other information using additional channels. In an example, a first layer applies N convolutional n×n×1 filters, e.g. n=3, on each sample of the input image. Thus, N values are obtained for each sample. A bias may then be added to each value followed by a non linear function such as a ReLU. The ReLU returns 0 if the input value is negative and the input value if positive. In a second layer, M convolutional 3×3×N filters are applied, followed by the addition of a bias and a ReLU function. Several such layers may be applied successively.

In-loop filters, such as SAO or DBF, are applied on the reconstructed samples of the video pictures, aiming at reducing the coding artefacts, mostly due to the quantization of the signal. The output of these filters is stored in a RPB (Reference Picture Buffer) of an encoder (decoder respectively). In loop filters are classically optimized using an objective metric (usually based on an L1 or L2 norm) filtered pictures are used as reference pictures for prediction.

Using a more perceptual metric, such as MS-SSI, to optimize these filters, generally degrades the performance of the compression, namely of the prediction, since the resulting images are used as reference for the prediction.

Out-of-loop filters (e.g. those run in TV sets) are preferably optimized using a perceptual metric since images are filtered to improve picture rendering on the display. For example, such additional post-filters are applied in set-top boxes or TV-set to adapt picture rendering to the display characteristics. As these filtered images are not used as reference images for prediction, perceptual improvement can be performed. Using an objective metric, such as a L2 norm, generally limit perceptual improvement.

These 2 types of filtering are optimized independently in current systems and lead to sub-optimal filtering, and/or higher complexity.

In at least one embodiment, a multi-part CNN is trained by jointly optimizing the reconstructed image quality for later use as reference in the codec and the image visual quality for display. A multi-part CNN comprises at least two CNNs, e.g. a CNNa and a CNNb as in FIGS. 7A, 8A and 9A.

Figure 6:
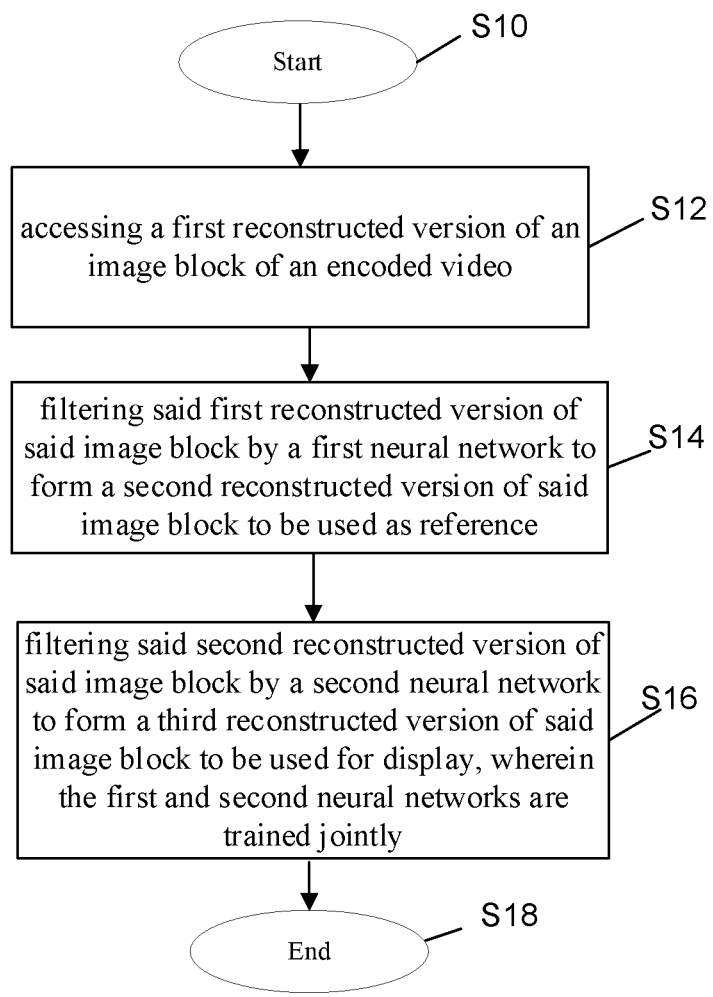
FIG. 6 illustrates an exemplary method for filtering a reconstructed image block according to an embodiment.

FIG. 6 illustrates an exemplary method for filtering a reconstructed image block according to an embodiment. The method of FIG. 6 may be used in both an encoding method and a decoding method.

The method starts at step S10. At S12, a first reconstructed version of an image block is accessed. At S14, the first reconstructed version of the image block is filtered by a first neural network to form a second reconstructed version of the image block to be used as reference. At S16, the second reconstructed version of the image block is filtered by a second neural network to form a third reconstructed version of the image block to be displayed. According to this embodiment, the first and second neural networks are trained jointly. The method ends at S18.

Figure 7A:
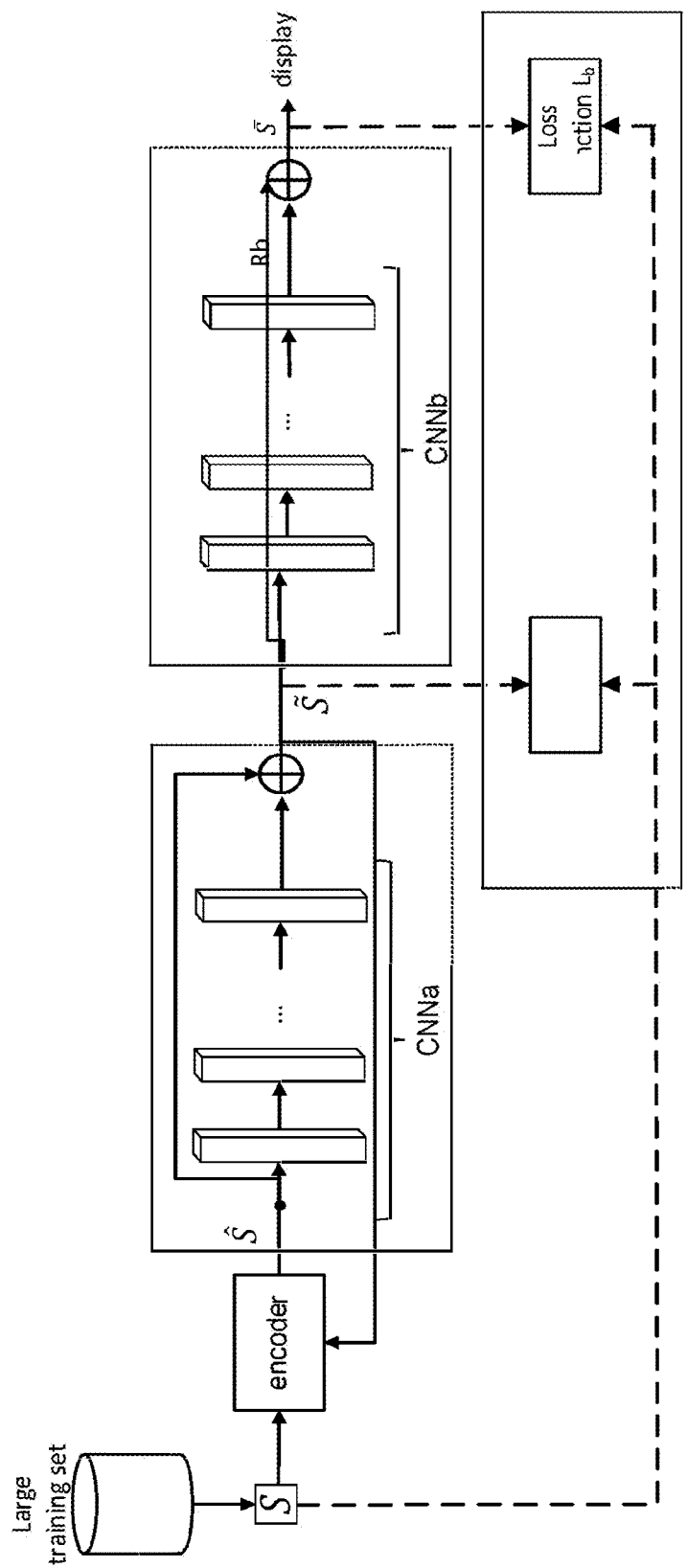
FIG. 7A illustrates the training process using a CNN as an in-loop filter and a CNN as an out-of-loop filter.

FIG. 7A shows that a CNNa and a CNNb are trained jointly on a large database of images, where CNNa is used as an in-loop filter and CNNb is used as an out-of-loop filter according to a first embodiment. The training uses as input S, S̃ and S̄. The input Ŝ of CNNa are the pixels of the reconstructed images (luminance and/or chroma channels). The Deep Neural Network CNNa used is a Fully Convolutional Neural Network (FCNN) learning a residual Ra to be added to the reconstructed image Ŝ to produce a restored image S̃. The latter is optimized to serve as reference for coding other images of the video.

The Deep Neural Network CNNb used is a Fully Convolutional Neural Network (FCNN) learning a residual Rb to be added to S̃ to produce a restored image S̄ to be displayed. The output S̃ of CNNa is used as input of CNNb. The whole CNN has 2 parts CNNa for the in-loop filtering and CNNb for the out-of-loop filtering. The two parts of the network are trained jointly. The first loss function, $L_a$ used to train the objective filtering, i.e. CNNa, is typically a L1 or L2 norm between the original image S and image filtered S̃ by CNNa: $L_a=\|S-\tilde{S}\|$. The second loss $L_b$ used to train the perceptual filtering, i.e. CNNb, is typically designed using advanced functions. A discriminator such as the one in Generative Adversarial Network (GAN) may be used for example. Generative adversarial networks (GANs) are a class of artificial intelligence algorithms used in unsupervised machine learning, implemented by a system of two neural networks. One network, a generative model, G captures the data distribution, and one network, a discriminative model D, estimates the probability that a sample came from the training data rather than G. The training procedure for G is to maximize the probability of D making a mistake. This framework corresponds to a minimax two-player game.

Figure 7B:
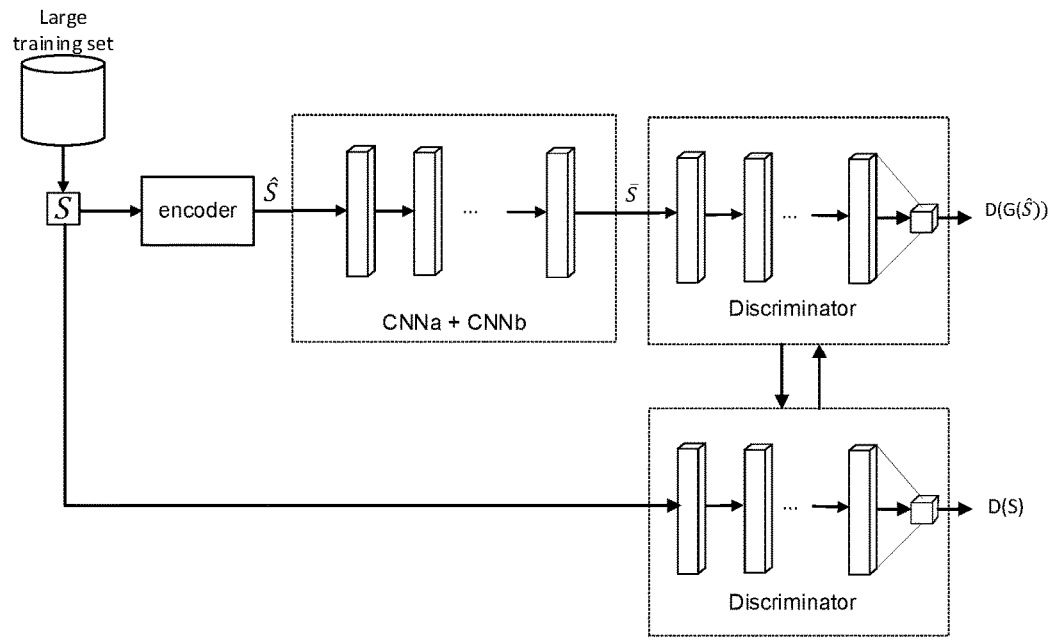
FIG. 7B depicts a discriminator based loss function.

FIG. 7B depicts a discriminator based loss function. The discriminator is used to determine Lb loss.

The reconstructed image Ŝ is filtered by the whole network, thus by CNNa and CNNb, to produce the filtered image S̄.

S̄ is input in the discriminator to output a discriminator score D(S̄)=D(G(Ŝ)), where D( ) represents the discriminator forward function and G( ) the generator forward function (here the output of the codec send as the input of CNNa+CNNb)

The original image S is also input in the discriminator

During discriminator training, the following function is maximized:

$$\max_{\theta_d}[\log D(x) + \log(1 - D(G(x))]$$

where θd are the network parameters of the discriminator.
During generator training, the following loss is minimized:

$$\min_{\theta_g}[\log(1 - D(G(x))]$$

Where θg are the network parameters of the generator CNNa+CNNb.

Another method comprises building a discriminator network taking as input both S and S̄, and having the network discriminate between original and filtered image.

A typical D( ) function is a classification function. The discriminator tries to classify original images as correct (score=1), and filtered images as incorrect (score=0). A typical classifier uses a ResNet network, but more advanced networks, especially based on multi-scale analysis can be used as discriminator.

The final loss function during the whole network CNNa+CNNb training can be expressed as:

$$L=L_a+\lambda L_b+\gamma R=\|S-\tilde{S}\|^2+\lambda[\log(1-D(G(x))]+\gamma\|W\|^2$$

Where λ and γ are parameters that aim at balancing the different terms, and R a typical weights regularization function used to improve the convergence, here set to the L2 norm of the weights of CNNa+CNNb.

Figure 7C:
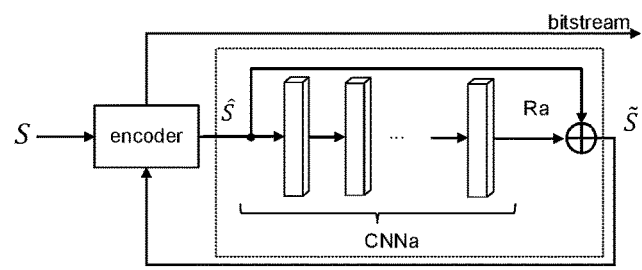
FIGS. 7C and 7D illustrate the encoding process and the decoding process, respectively, using a CNN as an in-loop filter and a CNN as an out-of-loop filter according to a first embodiment.
Figure 7D:
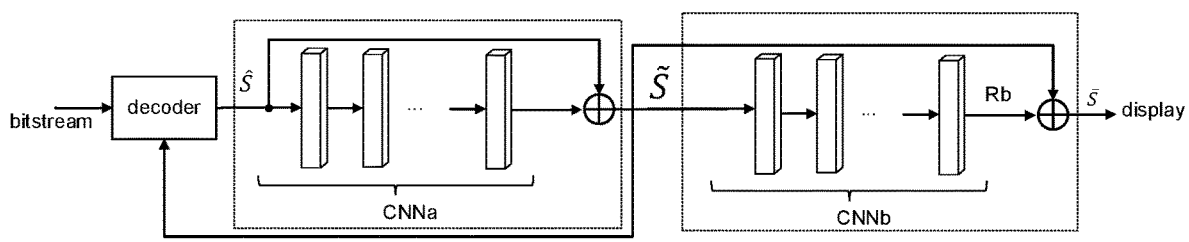

FIG. 7C shows that the resulting CNNa is used in the encoder to restore images after reconstruction. Symmetrically, the decoder as shown in FIG. 7D receives the bitstream, reconstructs the images and restores the images using the CNNa and CNNb determined according to the first embodiment.

Figure 8A:
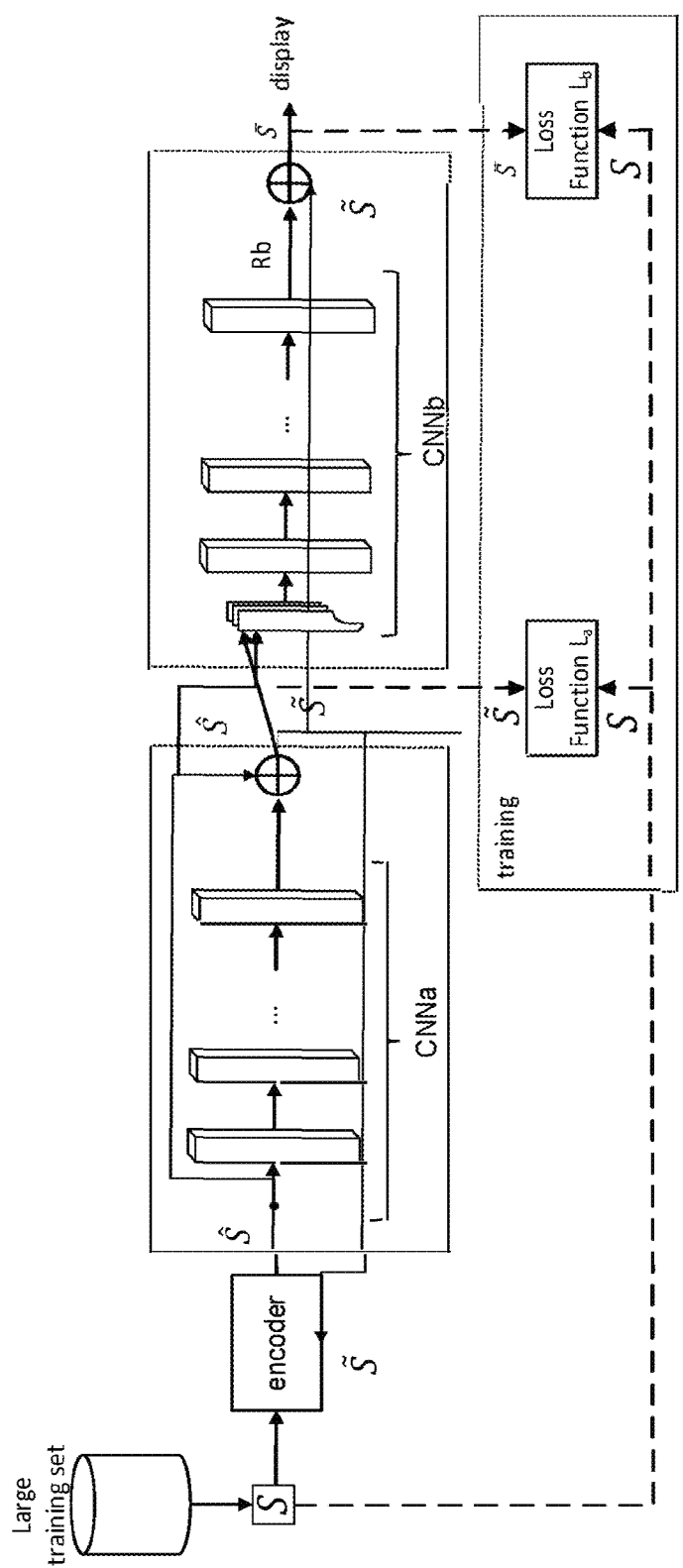
FIGS. 8A, 8B and 8C illustrate the encoding process and the decoding process, respectively, using a CNN as an in-loop filter and a CNN as an out-of-loop filter according to a second embodiment.

FIG. 8A shows that a CNNa and a CNNb are trained jointly on a large database of images, where CNNa is used as an in-loop filter and CNNb is used as an out-of-loop filter according to a second embodiment. The input of CNNb consists of both the reconstructed image Ŝ and the restored image of the in-loop-filter S̃. It allows the second network CNNb to leverage the information on the restoration already performed by the first network CNNa. Both inputs of CNNb Ŝ and S̃ are concatenated, i.e. for each pixel a vector with two values is obtained (a value from Ŝ and a value from S̃). The concatenation of the two inputs thus results in a tensor of size W×H×2. The first layer of CNNb thus applies N convolutional n×n×2 filters, e.g. n=3, on each sample. The same loss functions La and Lb as used in the first embodiment and depicted on FIG. 7A may be used. In particular, the discrimator of FIG. 7B may thus be used to define the loss function Lb.

In a variant the CNNb does not use the image restored by CNNa (final output of CNNa) but instead use an intermediate representation, e.g. a latent representation (typically, the output of the layer before the last layer, having a size W×H×N instead of W×H×1 for the final output). It allows the CNNb to leverage the latent representation of CNNa to perform the perceptual filtering.

Figure 8B:
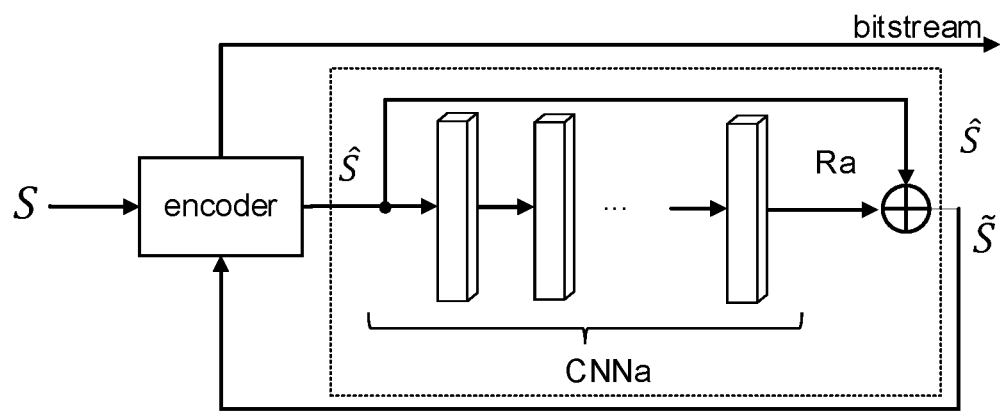
Figure 8C:
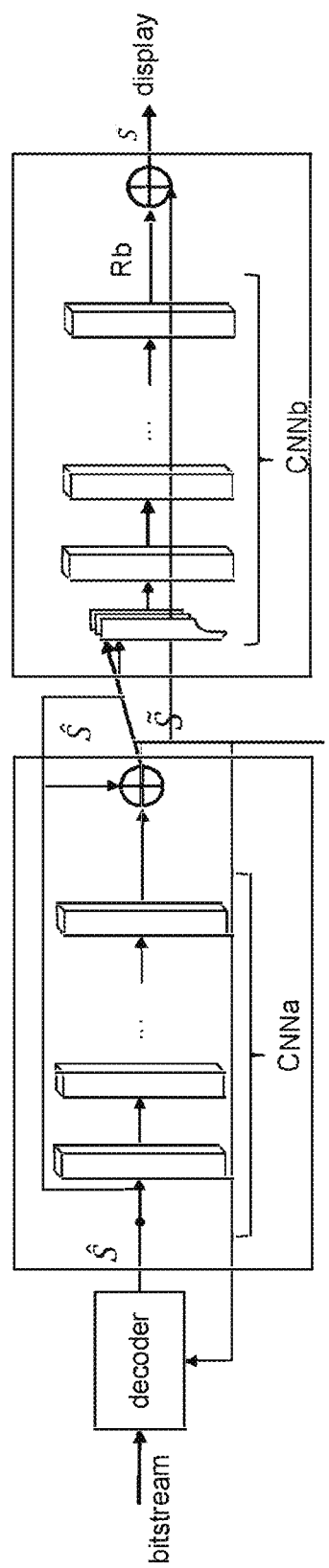

FIG. 8B shows that the resulting CNNa is used in the encoder to restore images after reconstruction. The encoder is identical in the first (FIG. 7C) and second (FIG. 8B) embodiments. Symmetrically, the decoder as shown in FIG. 8C receives the bitstream, reconstructs the images and restores the images using the CNNa and CNNb determined according to the second embodiment.

Figure 9A:
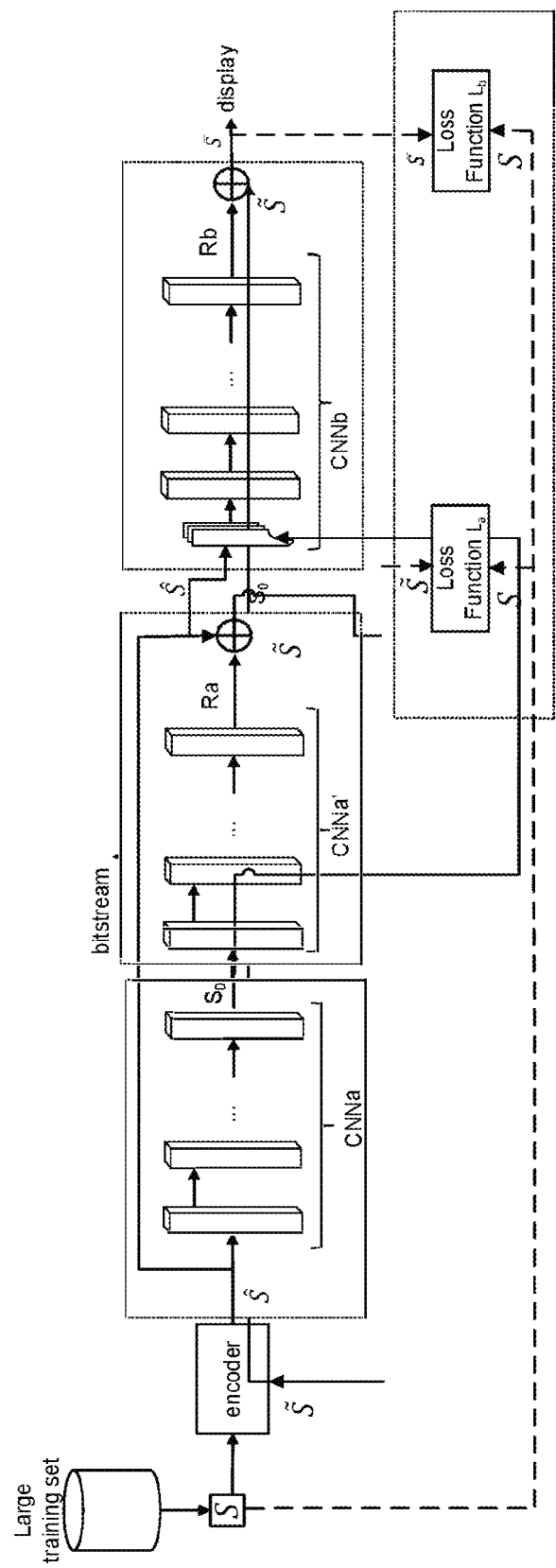
FIGS. 9A, 9B and 9C illustrate the encoding process and the decoding process, respectively, using a CNN as an in-loop filter and a CNN as an out-of-loop filter according to a third embodiment.

FIG. 9A shows that a CNNa, CNNa' and a CNNb are trained jointly on a large database of images according to a third embodiment.

The network comprises three parts: CNNa, CNNa' and CNNb. The output S( ) of CNNa is used as input for both CNNa' and CNNb. The network CNNa' aims at restoring the image. The main idea is to have a common part (CNNa) used by both objective and perceptual filtering, and specialized parts (CNNa' for objective filtering and CNNb for perceptual filtering). The output S0 is not necessarily an image but may be a tensor. A tensor S0 may typically have a dimension W×H×N where W×H are the image dimensions and N is the number of convolutions on the last layer of CNNa. The same loss functions as used in the first embodiment as depicted on FIG. 7A may be used.

Figure 9B:
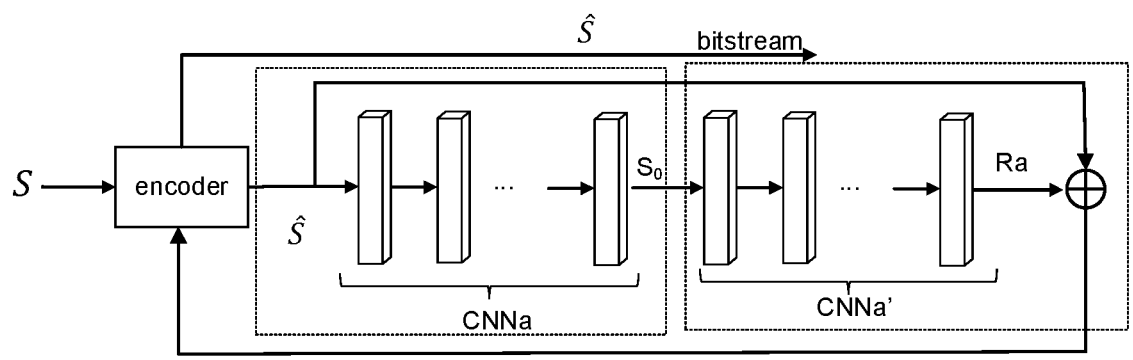
Figure 9C:
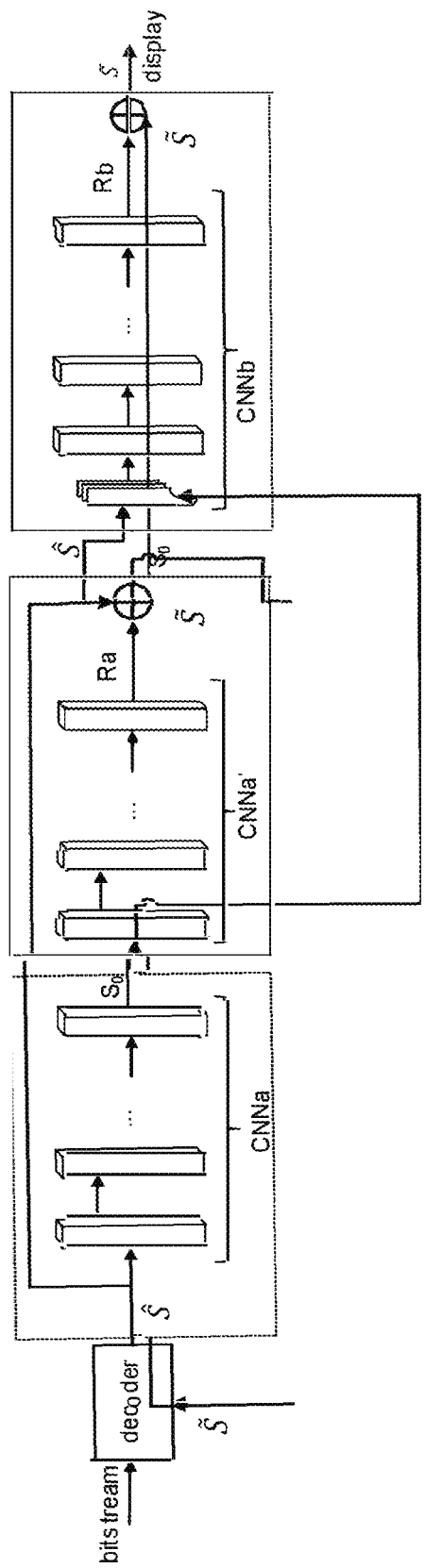

FIG. 9B shows that the resulting CNNa and CNNa' are used in the encoder to restore images after reconstruction. Symmetrically, the decoder as shown in FIG. 9C receives the bitstream, reconstructs the images and restores the images using the CNNa, CNNa' and CNNb determined according to the second embodiment.

In one variant that may be applied to the three embodiments, the coefficients of the "out-of-loop filter", i.e. the network parameters of CNNb, are transmitted in the bitstream. In a second variant also applicable to the three embodiments, the coefficients are learned by training on a large data set and known by the post-filtering module.

The three embodiments make it possible to get an optimal image restoration for display, while keeping the codec performances high by combining jointly trained CNN-based filters. It also relies on the sharing of the layers of CNNa and CNNb, decreasing the computational need for CNNb. The sharing is even higher for the third embodiment.

FIG. 10 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip. The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, filtering an image block with at least two neural networks which are trained jointly.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, filtering an image block with at least two neural networks which are trained jointly. As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, the coefficients of the neural networks, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of coefficients of a neural network. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Using at least two neural networks to filter a reconstructed image block, wherein the two neural networks are trained jointly;

A bitstream or signal that includes one or more of the described syntax elements, or variations thereof.

A bitstream or signal that includes syntax conveying information generated according to any of the embodiments described.

Inserting in the signaling syntax elements that enable the decoder to adapt in-loop and/or out-of-loop filtering in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs in-loop and out-of-loop filtering processes according to any of the embodiments described.

A TV, set-top box, cell phone, tablet, or other electronic device that performs in-loop and out-of-loop filtering processes according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs in-loop and out-of-loop filtering processes according to any of the embodiments described.

A TV, set-top box, cell phone, tablet, or other electronic device that receives (e.g. using an antenna) a signal over the air that includes an encoded image, and performs in-loop and out-of-loop filtering processes according to any of the embodiments described.

According to a general aspect of at least one embodiment, a method for video decoding is presented, comprising:

accessing a first reconstructed version of an image block of an encoded video; and filtering said first reconstructed version of said image block by a first neural network to form a second reconstructed version of said image block to be used as reference, filtering said second reconstructed version of said image block by a second neural network to form a third reconstructed version of said image block to be displayed, wherein the first and second neural networks are trained jointly.

According to a general aspect of at least one embodiment, an apparatus for video decoding is presented, comprising one or more processors configured to perform: accessing a first reconstructed version of an image block of an encoded video; and filtering said first reconstructed version of said image block by a first neural network to form a second reconstructed version of said image block to be used as reference, filtering said second reconstructed version of said image block by a second neural network to form a third reconstructed version of said image block to be displayed, wherein the first and second neural networks are trained jointly.

In an embodiment, the first reconstructed version of said image block is used as an additional input to train said second neural network.

In an embodiment, filtering said first reconstructed version of said image block by a first neural network to form a second reconstructed version of said image block to be used as reference comprises:

filtering said first reconstructed version of said image block by an initial neural network to form an initial reconstructed version of said image block to be used as input of said first and second neural networks;

wherein said initial neural network is trained to optimize objective and perceptual filtering.

In an embodiment, an intermediate representation of the output of the first neural network is used as an input of said second neural network to train said second neural network.

According to a general aspect of at least one embodiment, a method for encoding video data is presented, comprising:
accessing a first reconstructed version of an image block of an encoded video; and
filtering said first reconstructed version of said image block by a first neural network to form a second reconstructed version of said image block to be used as reference,
filtering said second reconstructed version of said image block by a second neural network to form a third reconstructed version of said image block to be displayed, wherein the first and second neural networks are trained jointly.

According to a general aspect of at least one embodiment, an apparatus for encoding video data is presented, comprising one or more processors configured to perform:
accessing a first reconstructed version of an image block of an encoded video; and
filtering said first reconstructed version of said image block by a first neural network to form a second reconstructed version of said image block to be used as reference,
filtering said second reconstructed version of said image block by a second neural network to form a third reconstructed version of said image block to be displayed, wherein the first and second neural networks are trained jointly.

In an embodiment, the first reconstructed version of said image block is used as an additional input to train said second neural network.

In an embodiment, the filtering said first reconstructed version of said image block by a first neural network to form a second reconstructed version of said image block to be used as reference comprises:
filtering said first reconstructed version of said image block by an initial neural network to form an initial reconstructed version of said image block to be used as input of said first and second neural networks;
wherein said initial neural network is trained to optimize objective and perceptual filtering.

In an embodiment, the first neural network is trained using a first loss function between said image block and the second reconstructed version of said image block.

In an embodiment, the first loss function is a L1 or L2 norm.

In an embodiment, the second neural network is trained using a second loss function between said image block and the third reconstructed version of said image block.

In an embodiment, the second loss function is determined using a Generative Adversarial Network.

In an embodiment, an intermediate representation of the output of the first neural network is used as an input of said second neural network to train said second neural network.

The invention claimed is:

1. A method for video decoding, comprising:
accessing a first reconstructed version of an image block from video data;
in-loop filtering the first reconstructed version of the image block by applying an inference process based on an in-loop filter implemented by a first neural network to form a second reconstructed version of the image block adapted to be used as reference for prediction; and
out-of-loop filtering a version based on the second reconstructed version of the image block by applying an inference process based on an out-of-loop filter implemented by a second neural network to form a third reconstructed version of the image block adapted for display,
wherein the in-loop filter and the out-of-loop filter are trained jointly using a joint loss function.

2. The method of claim 1, wherein the first reconstructed version of the image block is used as an additional input to train the out-of-loop filter.

3. The method of claim 1, wherein the version based on the second version is the second version or an intermediate representation of the output of the in-loop filter corresponding to an output of a layer before a last layer of the in-loop filter.

4. A non-transitory information storage medium storing program code instructions for implementing the method according to claim 1.

5. A method for video encoding, comprising:
accessing a first reconstructed version of an image block of a picture from video data; and
in-loop filtering the first reconstructed version of the image block using an in-loop filter implemented in the form of an inference process of a first neural network to form a second reconstructed version of the image block adapted to be used as reference for prediction,
wherein the in-loop filter is trained jointly with an out-of-loop filter implemented in the form of an inference process of a second neural network used for out-of-loop filtering a version based on the second reconstructed version of the image block to form a third reconstructed version of the image block adapted for display, the in-loop filter and the out-of-loop filter being trained using a joint loss function.

6. The method of claim 5, wherein the first reconstructed version of the image block is used as an additional input to train the out-of-loop filter.

7. A non-transitory information storage medium storing program code instructions for implementing the method according to claim 5.

8. The method of claim 5, wherein the joint loss function comprises a first term representative of a first loss function between the image block and the second reconstructed version of the image block.

9. The method of claim 8, wherein the first loss function is a L1 or L2 norm.

10. The method of claim 5, wherein the joint loss function comprises a second term representative of a second loss function between the image block and the third reconstructed version of the image block.

11. The method of claim 10, wherein the second loss function is determined using a Generative Adversarial Network.

12. The method of claim 10, wherein the first reconstructed version of the image block is used as an additional input to train the out-of-loop filter.

13. An apparatus for video decoding comprising one or more processors configured to perform:
accessing a first reconstructed version of an image block from video data;
in-loop filtering the first reconstructed version of the image block by applying an inference process based on an in-loop filter implemented by a first neural network to form a second reconstructed version of the image block adapted to be used as reference for prediction; and
out-of-loop filtering a version based on the second reconstructed version of the image block by applying an inference process based on an out-of-loop filter implemented by a second neural network to form a third reconstructed version of the image block adapted to display, wherein the in-loop filter and the out-of-loop filter are trained jointly using a joint loss function.

14. The apparatus of claim 13, wherein the first reconstructed version of the image block is used as an additional input to train the out-of-loop filter.

15. The apparatus of claim 13, wherein the version based on the second version is the second version or an intermediate representation of the output of the in-loop filter corresponding to an output of a layer before a last layer of the in-loop filter.

16. An apparatus for video encoding comprising one or more processors configured to:
　accessing a first reconstructed version of an image block of a picture from video data; and
　in-loop filtering the first reconstructed version of the image block using an in-loop filter implemented in the form of an inference process of a first neural network to form a second reconstructed version of the image block to be used as reference for prediction,
　wherein the in-loop filter is trained jointly with an out-of-loop filter implemented in the form of an inference process of a second neural network used for out-of-loop filtering a version based on the second reconstructed version of the image block to form a third reconstructed version of the image block to be displayed, the in-loop filter and the out-of-loop filter being trained using a joint loss function.

17. The apparatus of claim 16, wherein the first reconstructed version of the image block is used as an additional input to train the out-of-loop filter.

18. The apparatus of claim 16, wherein the joint loss function comprises a first term representative of a first loss function between the image block and the second reconstructed version of the image block.

19. The apparatus of claim 16, wherein the joint loss function comprises a second term representative of a second loss function between the image block and the third reconstructed version of the image block.

20. The apparatus of claim 19, wherein the first reconstructed version of the image block is used as an additional input to train the out-of-loop filter.

* * * * *